(12) United States Patent
Stern et al.

(10) Patent No.: US 11,712,025 B2
(45) Date of Patent: *Aug. 1, 2023

(54) EDIBLE PET CHEW MADE FROM AN EDIBLE MALLEABLE SHEET

(71) Applicant: PetMatrix LLC, Saddle Brook, NJ (US)

(72) Inventors: Mark Stern, New York, NY (US); Peter B. Wheeler, Honolulu, HI (US)

(73) Assignee: PetMatrix LLC, Saddle Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,074

(22) Filed: Jan. 19, 2022

(65) Prior Publication Data
US 2022/0201979 A1    Jun. 30, 2022

Related U.S. Application Data

(60) Division of application No. 16/824,085, filed on Mar. 19, 2020, now Pat. No. 11,259,500, which is a division of application No. 13/749,892, filed on Jan. 25, 2013, now Pat. No. 10,624,317, which is a continuation-in-part of application No. 13/329,736,
(Continued)

(51) Int. Cl.
| | | |
|---|---|---|
| *A01K 15/00* | (2006.01) | |
| *A01K 15/02* | (2006.01) | |
| *A23K 40/25* | (2016.01) | |
| *A23K 40/20* | (2016.01) | |
| *A23K 20/147* | (2016.01) | |
| *A23K 10/30* | (2016.01) | |
| *A23K 20/163* | (2016.01) | |
| *A23K 10/20* | (2016.01) | |
| *A23K 10/26* | (2016.01) | |

(Continued)

(52) U.S. Cl.
CPC ............ *A01K 15/026* (2013.01); *A23K 10/20* (2016.05); *A23K 10/26* (2016.05); *A23K 10/30* (2016.05); *A23K 20/147* (2016.05); *A23K 20/163* (2016.05); *A23K 40/20* (2016.05); *A23K 40/25* (2016.05); *A23K 50/40* (2016.05); *A23K 50/42* (2016.05)

(58) Field of Classification Search
CPC ...... A01K 15/026; A23K 10/20; A23K 10/26; A23K 10/30; A23K 20/147; A23K 20/163; A23K 40/25; A23K 50/40; A23K 50/42
USPC .......................................................... 119/709
See application file for complete search history.

(56) References Cited

U.S. PATENT DOCUMENTS

| | | |
|---|---|---|
| 3,851,084 A | 11/1974 | Rossen et al. |
| 4,260,635 A | 4/1981 | Fisher |

(Continued)

OTHER PUBLICATIONS

Lora, "Vanilla & Chocolate Cookies—Four Ways", Jan. 11, 2013, Diary of a Mad Hausfrau, (See Adapted from Schwarzweiss ßeback from "Das Grosse Buch Varn Backen", Stedlfeld Verlag GmbH, 1994) http://www.diaryofamadhausfrau.com/2013/01/vanilla-chocolate-cookies-four-ways.html.
(Continued)

*Primary Examiner* — Richard T Price, Jr.
(74) *Attorney, Agent, or Firm* — Merchant & Gould P.C.

(57) ABSTRACT

An edible pet chew has an initially malleable sheet of a hardened chewable material dimensioned large enough and thin enough to be initially malleable for flexing, folding or
(Continued)

rolling into a final shape. The sheet is shaped into a final shape by flexing, folding or rolling and then hardened.

16 Claims, 6 Drawing Sheets

Related U.S. Application Data filed on Dec. 19, 2011, now Pat. No. 9,968,117, which is a continuation of application No. 12/703,942, filed on Feb. 11, 2010, which is a division of application No. 11/602,939, filed on Nov. 21, 2006, now Pat. No. 7,677,203, said application No. 13/749,892 is a continuation-in-part of application No. 12/764,480, filed on Apr. 21, 2010, now Pat. No. 8,455,025.

(51) Int. Cl.
  *A23K 50/40* (2016.01)
  *A23K 50/42* (2016.01)

(56) References Cited

U.S. PATENT DOCUMENTS

| | | | |
|---|---|---|---|
| 4,364,925 A | | 12/1982 | Fisher |
| 4,419,372 A | | 12/1983 | Greene et al. |
| 4,473,344 A | | 9/1984 | Sollich |
| 4,702,929 A | | 10/1987 | Lehn et al. |
| 4,771,733 A | | 9/1988 | Axelrod |
| 4,822,626 A | | 4/1989 | Spanier et al. |
| 4,868,002 A | | 9/1989 | Scaglione et al. |
| 4,921,714 A | | 5/1990 | Matthews et al. |
| 4,938,975 A | | 7/1990 | Waller |
| 5,047,231 A | | 9/1991 | Spanier et al. |
| 5,407,661 A | | 4/1995 | Simone et al. |
| 5,467,741 A | * | 11/1995 | O'Rourke ............ A01K 15/026 119/710 |
| 5,485,809 A | | 1/1996 | Carroll |
| 5,673,653 A | | 10/1997 | Sherrill |
| 5,695,797 A | | 12/1997 | Geromini et al. |
| 5,897,893 A | | 4/1999 | Mohilef |
| 6,044,800 A | * | 4/2000 | Kubo ............... A01K 15/026 119/710 |
| 6,110,521 A | | 8/2000 | Axelrod |
| 6,126,978 A | | 10/2000 | Axelrod |
| 6,155,522 A | | 12/2000 | Anderson |
| 6,178,922 B1 | | 1/2001 | Denesuk et al. |
| 6,200,616 B1 | * | 3/2001 | Axelrod .............. A23K 10/35 426/805 |
| 6,238,715 B1 | | 5/2001 | Baikie |
| 6,274,182 B1 | | 8/2001 | Axelrod et al. |
| 6,274,812 B1 | * | 8/2001 | Daoud ................ H02G 3/088 16/2.2 |
| 6,277,420 B1 | | 8/2001 | Andersen et al. |
| 6,365,133 B1 | | 4/2002 | Rich |
| 6,584,938 B2 | | 7/2003 | Sherrill et al. |
| 6,586,027 B2 | | 7/2003 | Axelrod et al. |
| 6,672,252 B2 | | 1/2004 | Levin et al. |
| 6,725,809 B1 | | 4/2004 | Olgin |
| 6,799,536 B1 | | 10/2004 | Jia et al. |
| 6,815,000 B2 | | 11/2004 | Kesler |
| 6,840,196 B2 | | 1/2005 | Kirch |
| 6,886,496 B1 | | 5/2005 | Brown |
| 6,886,497 B1 | | 5/2005 | Hague |
| 6,895,900 B2 | | 5/2005 | Hingst |
| 6,935,275 B2 | | 8/2005 | Jia et al. |
| 7,025,020 B2 | | 4/2006 | Brown |
| 7,082,894 B2 | | 8/2006 | Sherrill et al. |
| 7,112,345 B1 | | 9/2006 | McHale et al. |
| 7,194,981 B2 | | 3/2007 | Kirch et al. |
| 7,332,188 B2 | | 2/2008 | Axelrod |
| 7,579,038 B1 | | 8/2009 | Weinberg |
| 7,651,708 B2 | | 1/2010 | Schlebusch et al. |
| 7,677,203 B2 | | 3/2010 | Stern |
| 7,691,426 B2 | | 4/2010 | Axelrod et al. |
| 7,722,911 B2 | | 5/2010 | Liu et al. |
| 8,455,025 B2 | | 6/2013 | Stern et al. |
| 9,968,117 B2 | | 5/2018 | Stern |
| 2002/0119224 A1 | | 8/2002 | Axelrod et al. |
| 2004/0126462 A1 | | 7/2004 | Tepper et al. |
| 2005/0064073 A1 | | 3/2005 | Paluch et al. |
| 2005/0071927 A1 | | 4/2005 | Hague et al. |
| 2005/0145193 A1 | | 7/2005 | Kirch |
| 2005/0153040 A1 | | 7/2005 | Axelrod et al. |
| 2005/0217604 A1 | * | 10/2005 | Brown .................. A23K 40/30 119/710 |
| 2005/0271775 A1 | | 12/2005 | Kirch et al. |
| 2006/0067989 A1 | | 3/2006 | Denesuk et al. |
| 2006/0081195 A1 | | 4/2006 | Jiang |
| 2006/0121162 A1 | | 6/2006 | Garrett |
| 2006/0188611 A1 | | 8/2006 | Unlu et al. |
| 2006/0188632 A1 | | 8/2006 | Nie et al. |
| 2006/0196444 A1 | | 9/2006 | Radcliffe et al. |
| 2006/0233923 A1 | | 10/2006 | Campbell |
| 2007/0128337 A1 | | 6/2007 | Levin |
| 2007/0148104 A1 | | 6/2007 | Goettert et al. |
| 2007/0193531 A1 | | 8/2007 | Anderson et al. |
| 2007/0212456 A1 | | 9/2007 | Axelrod |
| 2007/0289552 A1 | | 12/2007 | Axelrod et al. |
| 2008/0003270 A1 | | 1/2008 | Garcia Martinez |
| 2008/0014311 A1 | | 1/2008 | Tepper et al. |
| 2008/0075808 A1 | | 3/2008 | Altemueller |
| 2008/0118606 A1 | | 5/2008 | Stern |
| 2008/0118607 A1 | | 5/2008 | Sandoval et al. |
| 2008/0145485 A1 | | 6/2008 | Tepper et al. |
| 2008/0193607 A1 | | 8/2008 | Tepper et al. |
| 2008/0248167 A1 | | 10/2008 | McMindes et al. |
| 2009/0004338 A1 | | 1/2009 | Anderson et al. |
| 2009/0110802 A1 | | 4/2009 | Pibarot et al. |
| 2009/0235872 A1 | | 9/2009 | Filipi et al. |
| 2009/0274800 A1 | | 11/2009 | Assenmacher et al. |
| 2010/0003393 A1 | | 1/2010 | Torney et al. |
| 2013/0036988 A1 | | 2/2013 | Lai |
| 2013/0340685 A1 | | 12/2013 | Grepper |

OTHER PUBLICATIONS

Greenies Product Information—1999 (6 pages).
International Search Report and the Written Opinion for International Appln. No PCT/US2011/033359, International Filing Date—Apr. 21, 2011, dated Jan. 2, 2012, pp. 9.
European Search Report and Written Opinion for Application No. EP 07 86 2146.3, dated May 31, 2012, 5 pages.
International Search Report and the Written Opinion for International Appln. No. PCT/US2007/024230, International Filing Date—Nov. 20, 2007, dated Apr. 1, 2008, pp. 10.

* cited by examiner

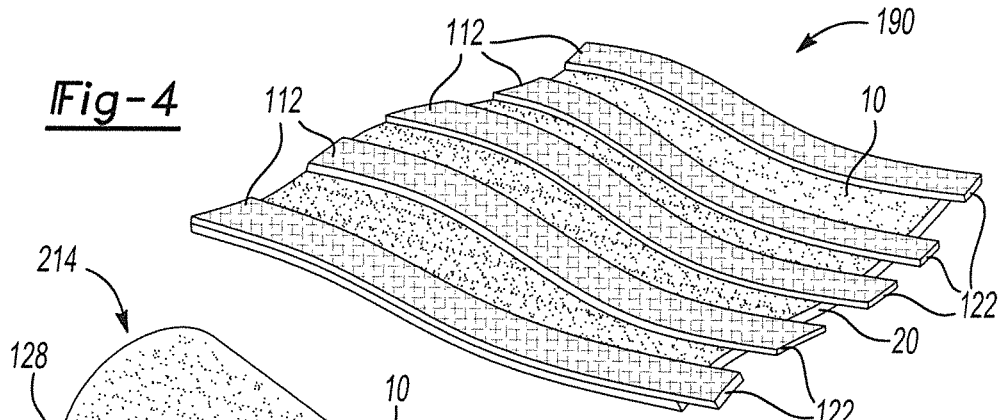
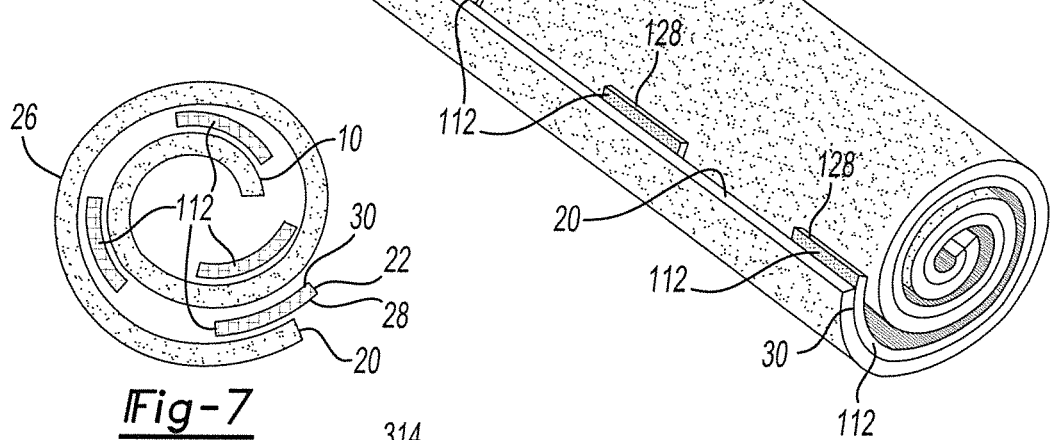
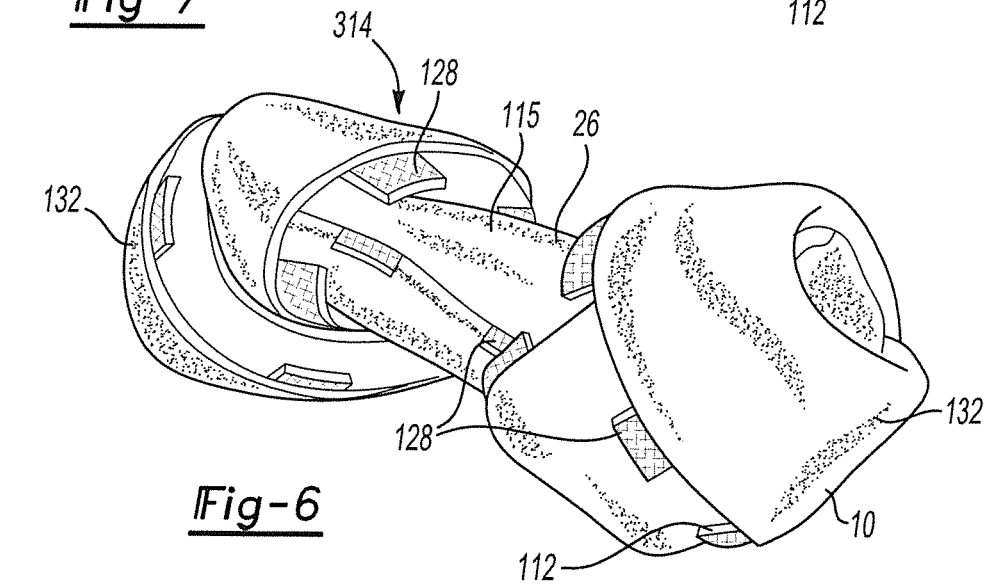

EDIBLE PET CHEW MADE FROM AN EDIBLE MALLEABLE SHEET

CROSS REFERENCE TO RELATED APPLICATIONS

This application is a divisional of U.S. patent application Ser. No. 16/824,085 filed on Mar. 19, 2020, which is a divisional of U.S. patent application Ser. No. 13/749,892 filed on Jan. 25, 2013, which is now U.S. Pat. No. 10,624,317 issued on Apr. 21, 2020, which is a continuation-in-part of U.S. patent application Ser. No. 13/329,736 filed on Dec. 19, 2011 which is now U.S. Pat. No. 9,968,117 issued on May 15, 2015, which is a continuation of U.S. patent application Ser. No. 12/703,942 filed on Feb. 11, 2010, which is a divisional of U.S. patent application Ser. No. 11/602,939 filed on Nov. 21, 2006, which is now U.S. Pat. No. 7,677,203 issued on Mar. 16, 2010 and Ser. No. 13/749,892 filed on Jan. 25, 2013, which is now U.S. Pat. No. 10,624,317 issued on Apr. 21, 2020, is a continuation-in-part of U.S. patent application Ser. No. 12/764,480 filed on Apr. 21, 2010, which is now U.S. Pat. No. 8,455,025 and Applicant hereby claims the benefit under 35 U.S.C. § 120.

TECHNICAL FIELD

The field of this invention relates to an edible pet chew.

BACKGROUND

A visit to a pet supermarket makes it readily apparent that there is a wide selection of rawhide and other synthetic chew toys manufactured and shaped for dogs and other carnivorous pets to chew on. Pet owners believe chew toys are desirable for cleaning the teeth of dogs and other pets, providing for dental hygiene and resulting in better breath. The chew toys also distract the pet from chewing on other objects such as shoes or furniture.

Many of these chew toys have been made from synthetic materials such as plastic, for example, nylon or even rubber to provide a long lasting chew toy. These synthetic chew toys are indigestible and may pose a health risk if the dog bites off a portion and swallows it. Secondly, these toys may lose a dog's interest because the toy typically has no flavor or other chew incentive.

Other chew toys are made from rawhide or other animal hides. Rawhide and other animal hides have an advantage of being able to be rolled and knotted. Rawhide also provides structural rigidity, ductility and durability for chewability. However, rawhide and other animal hides have little or no inherent flavor and thus may lose a dog's interest after only a short chew time. To overcome the lack of flavor and taste of rawhide and other animal hides, many manufacturers have attempted to add flavor to the pet chew by adding jerky, natural flavors to be carried by the structural rawhide and animal hides. Flavors may also be injected into the rawhide, marinated into the rawhide, wrapped in the rawhide or impregnated into the rawhide.

Many people are concerned that the manufacture of rawhide and other animal hides is a relatively unregulated industry. The manufacturing sources of the rawhide or other animal hides may be unknown and the degree of contamination of the rawhide or other animal hides with antibiotics, insecticides or other detrimental toxins for example, lead, may also be unknown. Furthermore, rawhide and other animal hides provide no nutritional benefits and are only slowly digestible if at all.

Rawhide in the world wide market is also becoming scarcer because the hides are being diverted for other purposes, for example, the production of gelatin. As such, rawhide is becoming more difficult and more expensive to obtain resulting in more expense for rawhide treats for pets. These health and economic concerns initiate a desire for dog owners to seek alternative ways to provide an edible chew treat for a pet without the use of rawhide or other animal hides.

Many pet chews recently placed on the market are made from a solid molded wheat based material with glycerin, gelatin, monoglycerides of edible fatty acid, and natural flavor. Some of these treats also contain chlorophyll which is marketed to improve the dog's breath. One such molded plant material composite is molded into an elongated shape with one end shaped like a toothbrush head and an opposite end shaped like an epiphysis i.e. end of a long bone. However, molded pet treats without meat lack a natural incentive for carnivorous pets. Pet chews without rawhide or other hides were molded into thicker shapes for structural integrity. Sheets of vegetable material up till now lacked the needed structural integrity and cohesiveness to stay together.

Co-extruded or molded products have been developed with both a vegetable based outer layer and inner meat based core to provide a meat incentive for a carnivorous pet. However, these co-extruded or molded pet treats lack a knot at one or both ends. The combination of a knot made from sheets of hide material allows for the dog to first grab or hold down the pet treat by clamping its paws down on the knot. Further, the multiple sheets allow the dog to pull the treat apart with its teeth. It is believed that the combination of two abilities, the ability of the dog to hold down the knotted treat with its paws, and the ability of the dog to pull on the treat with its teeth provides for a desirable treat. This accounts for the extreme popularity of knotted pet treats compared to extruded or molded pet treats.

Even though rawhide treats remain popular, a treat made from whole sheets of rawhide are prone to produce waste which adds to the expense of the treat. A layer of rawhide or composite with rawhide and a layer or sheet of jerky laid onto the rawhide layer requires the layers to be assembled and wrapped together and then knotted to provide a bone like appearance. This assembly can be relatively expensive.

What is needed is an improved edible pet chew that has an outer layer of hardened and chewable pet treat and having a tied knot that a dog can hold down with its paws while pulling apart with its teeth and is rawhide free and other animal hide free.

What is also needed is a fully digestible pet treat that has a knotted end to provide a meat incentive catering to the carnivorous nature of a dog that is free of rawhide and other animal hides.

What is needed is an improved edible pet chew that is economical to manufacture with a malleable sheet of hardened edible material made that is free of rawhide and other animal hides that is initially malleable for folding, rolling or flexing into a final shape and catering to the carnivorous nature of a dog.

What is also needed is an improved edible pet chew made from a co-extruded sheet of initially malleable but hardenable material that has co-extruded sections that have a different appearance or flavor.

SUMMARY OF THE DISCLOSURE

In accordance with one embodiment of the invention, an edible pet chew has a first sheet made of hardened chewable rawhide free and animal hide free composite material and a second sheet of a chewy edible material. The first and second sheets are superimposed adjacent each other into a composite assembly with the first sheet and second sheet forming alternating layers in the composite assembly. The first and second sheets are dimensioned large enough and thin enough from the composition to be initially malleable by flexing folding or rolling into a shape. In one embodiment, the first malleable sheet is made from a plant based material. In another embodiment, it may be a meat based or animal based material. In either case, it is materially animal hide free and particularly rawhide free.

Preferably, the first malleable sheet is wrapped about the second sheet. The first and second sheets wrap into a roll form to form an interleaved spiral shape in cross-section with the first sheet substantially forming a hardened layer of the edible pet chew. The first sheet is made from an initially malleable and hardenable sheet. The first sheet may be, in one embodiment, substantially plant base wheat protein and gelatin. In another embodiment, the first sheet may be a plant starch mixture. In another embodiment, the first sheet may be substantially a meat mixture that may also include gelatin and/or plant material e.g. starch or plant protein. Gelatin can also be added to provide malleability for extrusion, molding, wrapping and other bending and forming and ductility for chewing.

In one embodiment, the edible pet chew has a tied knot at each end thereof to resemble epiphyses of a bone. The second sheet may be formed from a meat composite bound with a binder. In one embodiment, the second sheet may be formed from a jerky of dried or cured animal flesh. The composite sheets are made such that the outer layer is harder than the inner layer and has ductility for chewing.

In accordance with another aspect of the invention, the edible pet chew includes a casing of substantially hardened chewable edible material that is rawhide or animal hide free with a chewy edible member therein. Preferably, the outer casing is in the form of a first sheet that provides an outer layer of the edible pet chew. The chewy edible member therein is substantially inside the edible pet chew and may be a cured or dried animal flesh, i.e. meat.

In accordance with another aspect of the invention, a method of forming an edible pet chew includes providing composition material made from rawhide free and animal hide free edible material that is extrudable or sheetable and initially malleable forming the initially malleable first sheet, providing a second sheet made from material having flavor, placing the first and second sheets in superimposed relation forming multiple layers wrapping the first sheet with the second sheet and hardening the first sheet after it is formed with the second sheet. Preferably, the wrapping includes the first and second sheets being rolled together and preferably rolled with the first sheet forming an outer layer. Preferably, the ends of the edible pet chew are tied into knots before hardening of the first sheet. The method also includes wrapping the first sheet about the second sheet to form an outer layer of the edible pet chew. In one embodiment there is only a single sheet of the animal flesh composition material that is rolled and tied into knots at each end to form the edible pet treat.

According to another aspect of the invention, an edible pet chew has a single malleable sheet made from rawhide and animal hide free edible material where the single sheet is dimensioned large enough and thin enough to be initially malleable for flexing folding or rolling into a final shape. The single malleable sheet is preferably rolled and knotted at each end to form the final shape of the pet chew. In one embodiment, the single sheet is a hardened chewable substantially plant based material. In another embodiment, the single sheet is made from substantially animal flesh. In one embodiment, the single malleable sheet has chunks of the cured or dried animal flesh material embedded therein.

In one embodiment, the single sheet is rolled to form a cylindrical roll and has a first edge section having a different appearance or flavor from a mid-section of the single sheet. The first edge section is positioned at an outer edge of the cylindrical roll. Preferably, the single sheet has first and second co-extruded areas with different appearances or flavors from each other.

According to another aspect of the invention, an edible pet chew has a malleable sheet co-extruded with a first edge section having a different appearance or flavor from a mid-section of the malleable sheet. The first edge section is preferably positioned at an outer edge of the pet chew and is part of the knot at one or both ends of the pet chew that is hardened into a final shape.

Preferably, a first section of the co-extruded single sheet has a first appearance or first flavor. A second section of the co-extruded sheet has a second appearance or second flavor. The malleable sheet is shaped by flexing, folding or rolling before hardening into its final shape. In another embodiment, the first and second sections are respective first and second layers of a co-extruded malleable sheet.

BRIEF DESCRIPTION OF THE DRAWINGS

Reference now is made to the accompanying drawings in which:

FIG. 4 shows a top plan view showing a plurality of meat flavored strips placed on top of the first sheet in preparation of forming another alternate embodiment of a pet chew;

FIG. 5 shows an alternate embodiment of an edible pet treat formed from the sheets shown in FIG. 4;

FIG. 6 shows an alternate embodiment of an edible pet treat formed also from the sheets shown in FIG. 4;

FIG. 7 shows a side view of another embodiment of an edible pet chew;

DETAILED DESCRIPTION OF THE PREFERRED EMBODIMENT

Figure 1:
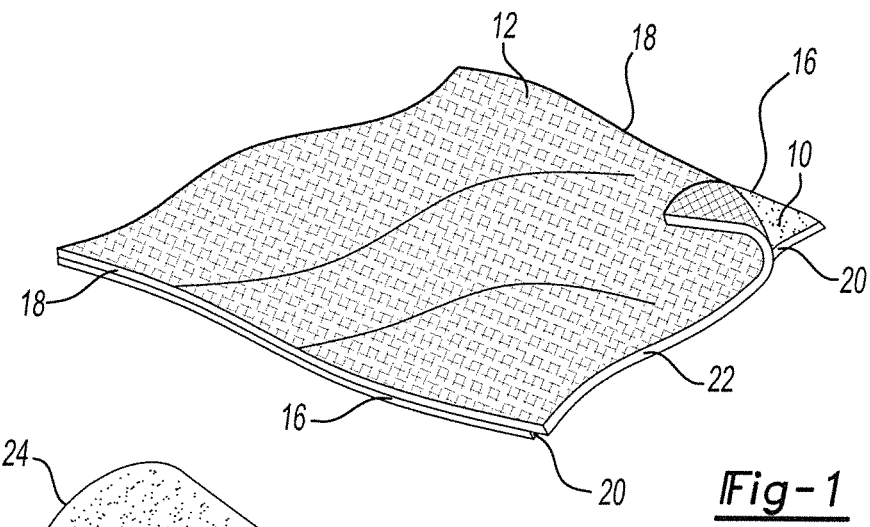
FIG. 1 is a perspective view showing a first sheet of a substantially animal flesh based material with a second jerky sheet laid over the first sheet in preparation of forming an edible pet chew in accordance with one embodiment of the invention.

Referring now to FIG. 1, a first sheet 10 of an extruded or rolled edible composition that is rawhide and animal skin free. It may be made, for example, of plant starch mixed with gelatin or other binder. Another composition may be a plant protein mixed with gelatin or other binder. Another composition may be substantially animal innards i.e. meat and tissue, organs and/or bones for example beef, pork, chicken and fish with or without plant material blended in. The animal innards as defined for these purposes is the animal flesh, i.e. muscle, connective tissues, organs and bones, but excludes skins or hides e.g. rawhide. This composition does not include any material amounts of hides, or skins, e.g. rawhide. Gelatin may be added to provide moldability and ductility. The material composition can provide sufficient malleability, moldability, extrudability, cohesiveness and formability as set forth in further detail below. Other plant materials may be substituted for the above mentioned plant materials as long as the material is a cohesive material that can be rolled and formed in a malleable state and eventually hardened by heat or drying into a structurally self-supporting hardened but ductile and chewable matter for use by a carnivorous pet. The sheet 10 may be formed by extrusion, pressing or rolling or injection molding for example.

A second sheet 12 may be made from flavored material, for example, natural meat jerky or a chicken jerky composition that is a mixture of meat and other binders to form a chewable composite that is malleable enough to be rollable. The first sheet 10 is harder and has greater chewing duration than the second sheet 12. In another variation, the second sheet 12 may also be made from an initially malleable animal flesh based sheet that is impregnated with meat, chicken, fish or jerky pieces or merely infused with flavors attractive to a pet. The sheet 12 is superimposed over the first sheet 10. In those preferred embodiments, each sheet 10 and 12 is substantially free of rawhide or other animal hides.

The side edges 18 of the second sheet may be coextensive, i.e. aligned with the side edges 16 of the first sheet 10. The front edge 22 of the second sheet may overlap the front edge 20 of sheet 10.

Figure 2:
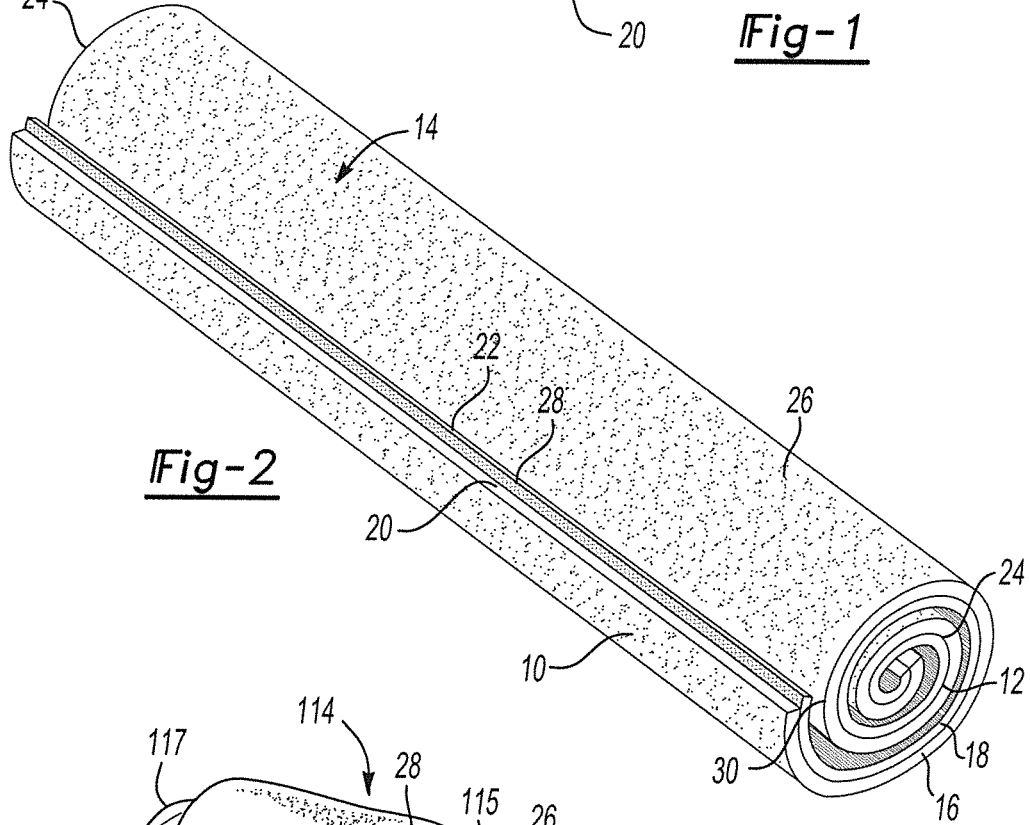
FIG. 2 is a perspective view of one embodiment of the edible pet chew.

Once the first and second sheets 10 and 12 as shown in FIG. 1, are flattened out, they are then rolled up as shown in FIG. 2 to form a cylinder shaped edible pet chew 14 having rolled ends 24 with interleaved layers of sheet 10 and sheet 12 with aligned edges 16 and 18. The sheets 10 and 12 form an interleaved spiral shape in cross-section. The sheets 10 and 12 are rolled such that the sheet 10 forms the outer layer 26. The front edge 22 of sheet 12 by extending further than the front edge 20 of sheet 10 forms a lip 28. The lips 28 project out of the seam 30 in the outer layer 26 adjacent the edge 20 of sheet 10. The cylinder shaped pet chew 14 is then allowed to dry to harden the composition forming the first sheet 10.

Figure 3:
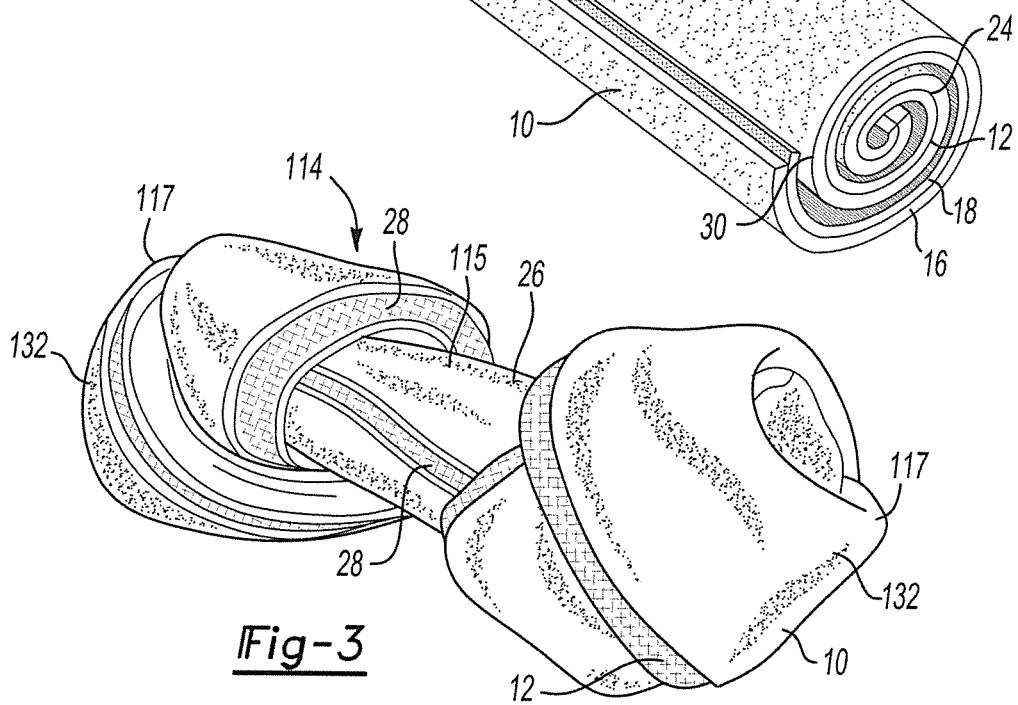
FIG. 3 shows another embodiment having two knotted ends to simulate the epiphyses of a bone with a diaphysis in the middle.

As shown in FIG. 3, an alternate shaped pet chew 114 can be formed to more closely simulate an elongated bone with an elongated middle section 115 also referred to as a diaphysis and opposite simulated epiphyses 117 formed by knots 132 tied at each end 24 of the cylinder shaped assembly 14 as shown in FIG. 2 before it is hardened. The alternately shaped edible pet chew 114 still has the same aligned edges 16, and 18 and the same lip 28 of the second sheet protruding out of seam 30 at the epiphyses 117 as well as therebetween is elongated middle section 115.

Another alternate embodiment composite sheet assembly 190 is shown in FIG. 4 where instead of single sheet of jerky material is disposed on sheet 10, a plurality of elongated strips of jerky i.e. narrow sheets 112 are spaced apart onto sheet 10. The narrow sheets 112 each have a front edge 122 extending beyond edge 20 of sheet 10. The sheet assembly 190 is laid flat and then rolled in the same fashion as before to form the cylinder assembly 214 shown in FIG. 5 that has at seam 30 a plurality of exposed lips 128 of the sheets 112. Again, this cylinder shape treat 214 may be dried and hardened as is or can be knotted in the same fashion as before to form the bone shaped pet treat 314 as shown in FIG. 6 with the exposed lips 128 formed in the knot ends 132 as well as the elongated middle section 115.

In a further embodiment, the elongated strips 112 may be laid transverse to what is shown in FIG. 4 so that when the sheets 110 and 112 are rolled, they produce an edible pet chew with an end as shown in FIG. 7 with an exposed solid lip 28 and a plurality of spaced sheets 112 within the outer layer 26 of sheet 10. Again, the cylinder may be allowed to dry and harden in this position or tied into a knot to form an edible pet chew that looks on the exterior substantially like the one shown in FIG. 3.

Figure 17:
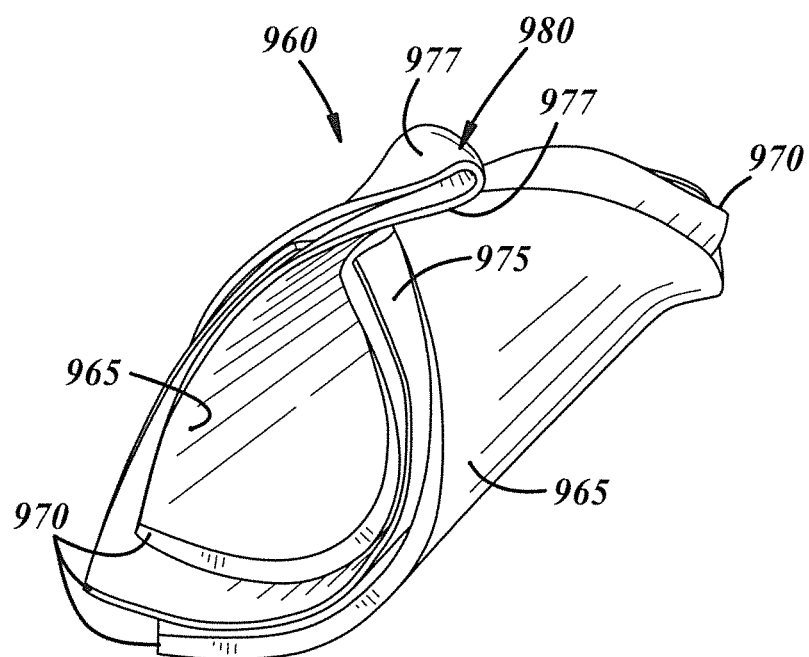
FIG. 17 is another embodiment showing an alternate shape of a pet chew with a malleable sheet.

It is foreseen that more than one first sheet 10 and more than one second sheet 12 of the flavor material may be used. It is also foreseen that the plurality of sheets 10, 12 may be interlayered without rolling to form a flat rectangular or other shaped edible pet chew. The composite pet chew may also be rolled, wrapped or folded into another shaped pet chew, for example, a treat 960 that has outer layer 965 folded over a meat layer 975 and rolled into a tubular shape with pointed tapered ends 970 and has overlapping section 977 or connected to apex 980 as shown in FIG. 17.

Figure 8:
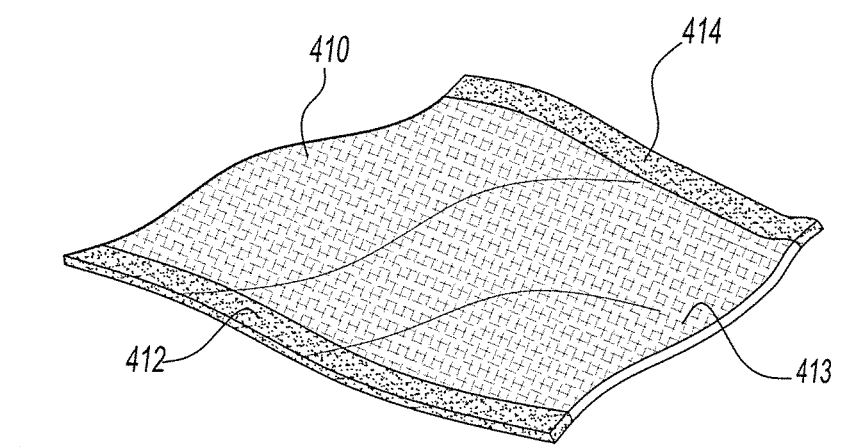
FIG. 8 is a perspective view showing a single sheet of a substantially animal flesh based material forming an edible pet chew in accordance with one embodiment of the invention.

FIG. 8 illustrates a single malleable edible sheet 410. In one embodiment, it is made from a rawhide free animal hide free edible composition. The single sheet 410 can be formed by extrusion, rolling, pressing or other process so that it is flat and thin. Its thickness preferably ranges from 2 mm to 5 mm. The sheet has width and length dimensions preferably ranging from 10 cm to 20 cm each. The composition of the single malleable sheet 410 may be the same blends or composition as the above-described first sheet 10. The composition may be modified as long as the material is a cohesive material that can be rolled and formed in a malleable state and eventually hardened by heat or drying into a self-supporting hardened but chewable matter for use by a carnivorous pet.

The single sheet 410 has a first edge section 412 and a second edge section 414 that may have a visually distinctive appearance, for example, a different color or texture from the remaining mid-section 413 of the sheet 410. In addition or alternatively, the edges 412, 414 may have a different flavor from the remaining mid-section 413. In one embodiment, the edge sections 412, 414 may be colored red to simulate a beef jerky. The edge sections 412, 414 may also have a different higher percentage of meat or other attractive scent or flavor infused or otherwise added to them than the midsection 413. The flavor additive may be either artificial or real.

Figure 9:
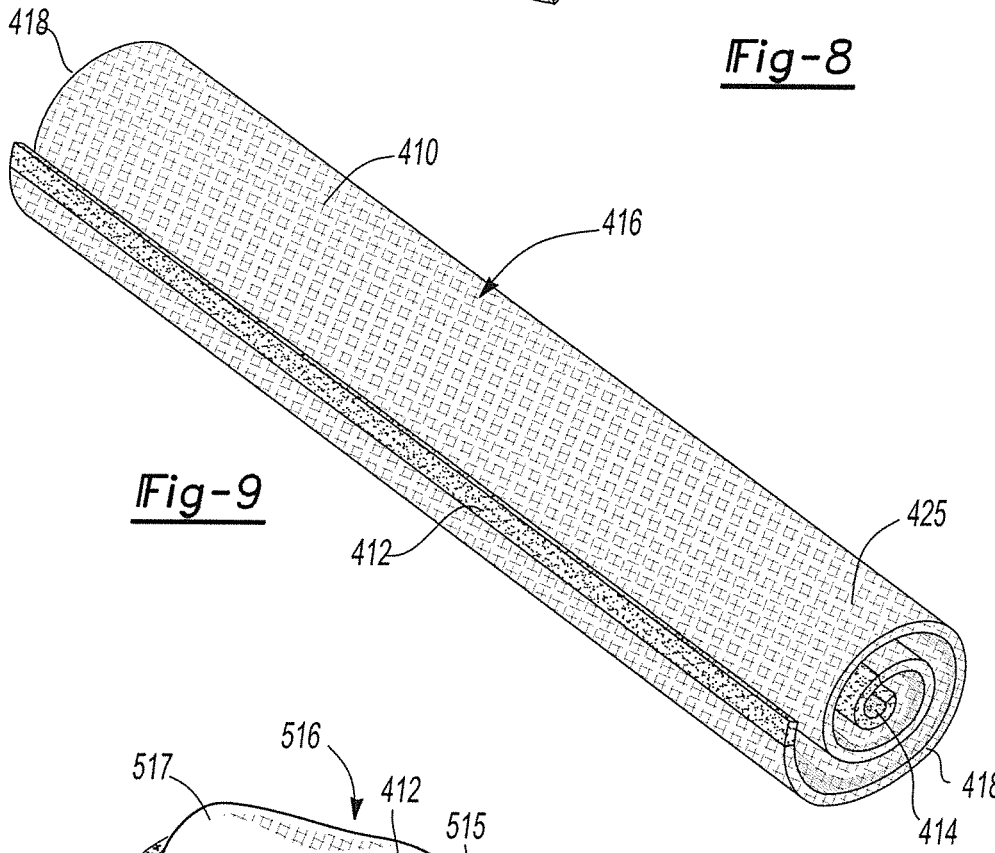
FIG. 9 is a perspective view of one embodiment of the edible pet chew using the single sheet shown in FIG. 8.

The single sheet 410 as shown in FIG. 8 is then rolled up as shown in FIG. 9 to form a cylinder roll shaped edible pet chew 416. The pet chew 416 has end sections 425 that appear from an end view to have a spiral shape 418. The edge section 414 is near the center or interior of the pet chew 416. The edge section 12 of single sheet 10 is positioned at the exterior side of pet chew 416 and provides an illusion that a piece of beef jerky extends out of a roll. The cylinder shaped pet chew 416 is then allowed to dry to harden the composition forming the single sheet 10.

Figure 10:
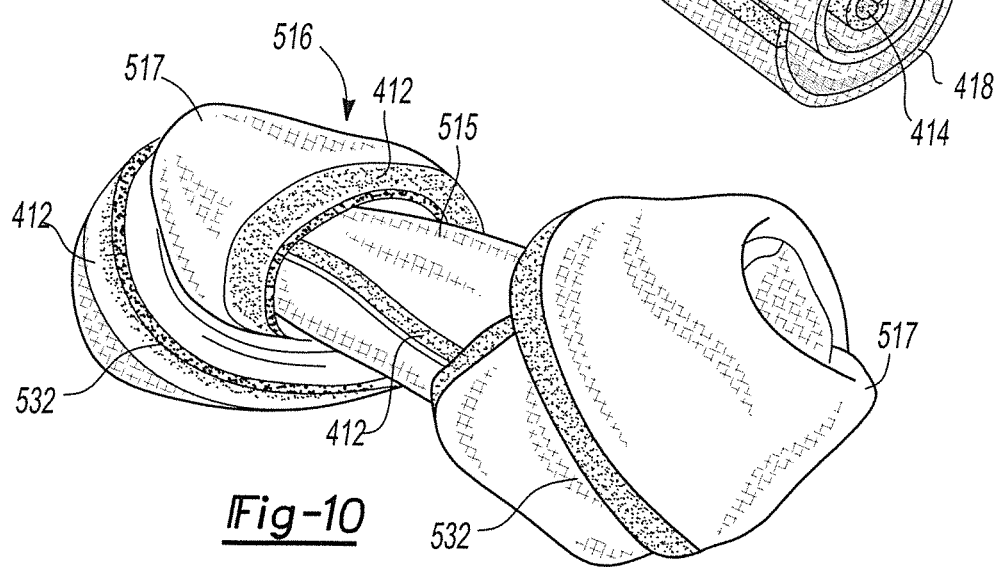
FIG. 10 is another embodiment having two knotted ends to simulate the epiphyses of a bone with a diaphysis in the middle using the single sheet shown in FIG. 8.

As shown in FIG. 10, an alternate shaped pet chew 516 can be formed to more closely simulate an elongated bone with an elongated middle section 515 also referred to as a diaphysis and opposite simulated epiphyses 517 formed by knots 532 tied at each end section 425 of the cylinder shaped assembly 416 as shown in FIG. 9 before it's hardened. The alternately shaped edible pet chew 516 still has the same flavored or colored edge section 412, positioned at an outer portion of the epiphyses 517 as well as at the exterior side of the elongated middle section 515 to stimulate a beef jerky strip extending out of the bone. Edge section 414 is positioned to the interior of the pet chew 516.

Figure 11:
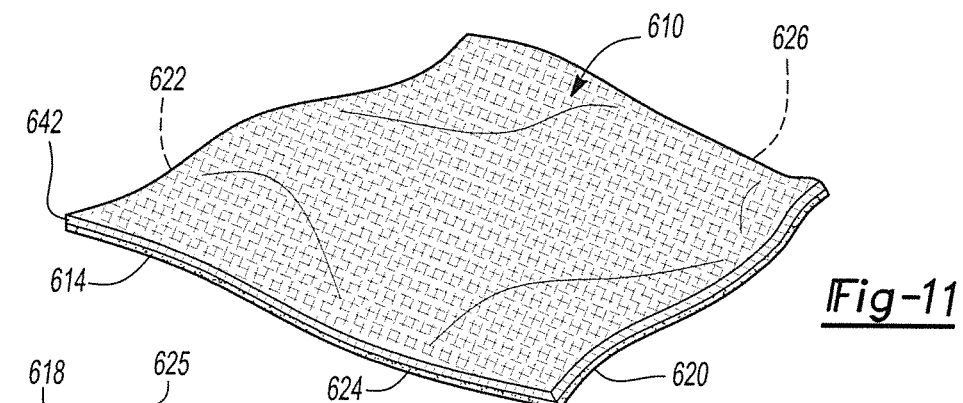
FIG. 11 is a perspective view showing a single co-extruded sheet of an animal flesh based material forming an edible pet chew in accordance with another embodiment of the invention.
Figure 12:
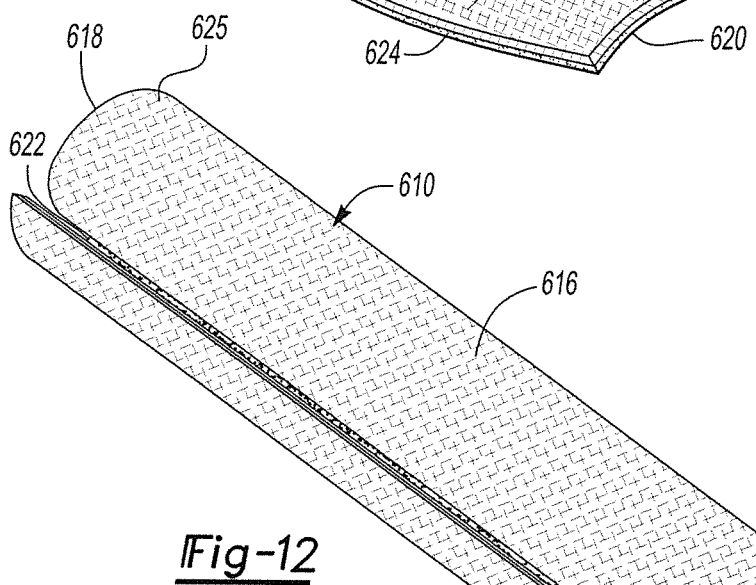
FIG. 12 is a perspective view of an embodiment of the edible pet chew using the single sheet shown in FIG. 11.
Figure 13:
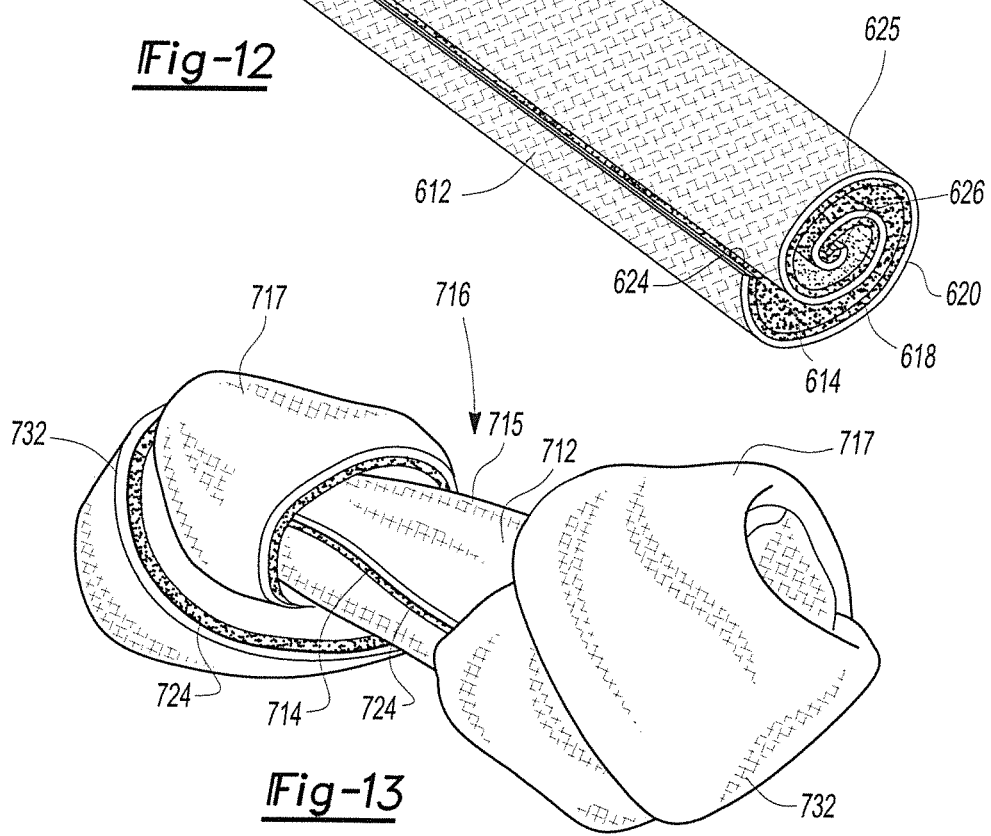
FIG. 13 is another embodiment having two knotted ends to simulate the epiphyses of a bone with a diaphysis in the middle using the single sheet shown in FIG. 11.

Another alternate embodiment of the sheet for making a pet chew is shown m FIGS. 11-13 which show a single co-extruded sheet 610. The coextruded sheet has two layers, one layer 612 has a different flavor or a visually distinctive appearance for example, a different color or texture from the other layer 614 of single sheet 610. In one embodiment, the layer 612 may be colored red to simulate a beef jerky. The flavor additive may again be either artificial or real. The co-extruded sheet can be a square or rectangular shape with edges 620, 622, 624 and 626.

The single sheet 610 as shown in FIG. 11 is then rolled up as shown in FIG. 12 to form a cylinder shaped edible pet chew 616. The pet chew 616 has end sections 625 that appear from an end view to have a spiral shape 618. The sheet 610 is rolled such that the layer 614 is considered the inner layer. The layer 612 of sheet 610 is positioned at the exterior side of the rolled pet chew 616. Edges 620, 622, 624, and 626 of layer 614 are visible after the rolled pet chew 216 is formed. The edges 620, 622, 624, and 626 of layer 614 form the illusion of beef jerky rolled into the rolled pet chew 616. The cylinder shaped pet chew 616 is then allowed to dry to harden the composition forming the single sheet 610.

As shown in FIG. 13, an alternate shaped pet chew 716 can be formed to more closely simulate an elongated bone with an elongated middle section 715 also referred to as a diaphysis and opposite simulated epiphyses 717 formed by knots 732 tied at each end section 625 of the cylinder shaped assembly 616 as shown in FIG. 12 before it's hardened. The alternately shaped edible pet chew 716 has the flavored, textured or colored layer 614 with the edge 624 of layer 614 exposed at the epiphyses 717 as well as at the elongated middle section 715.

Figure 14:
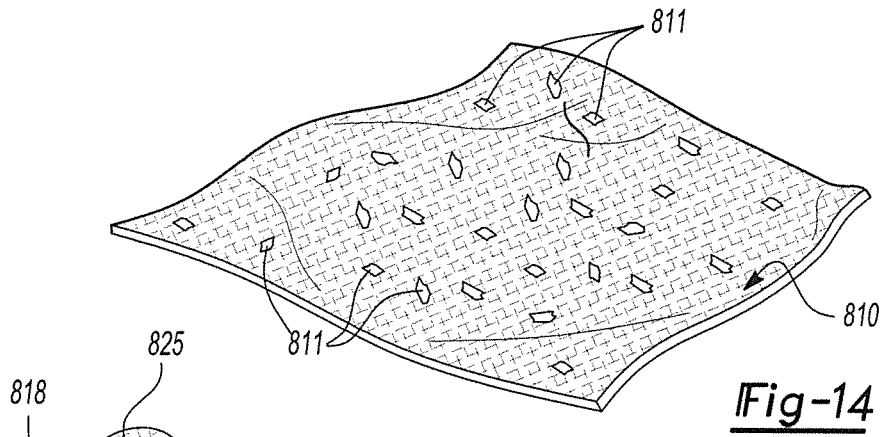
FIG. 14 is a perspective view showing a single sheet of animal flesh based material with embedded chunks of meat interspersed throughout forming an edible pet chew in accordance with another embodiment of the invention.
Figure 15:
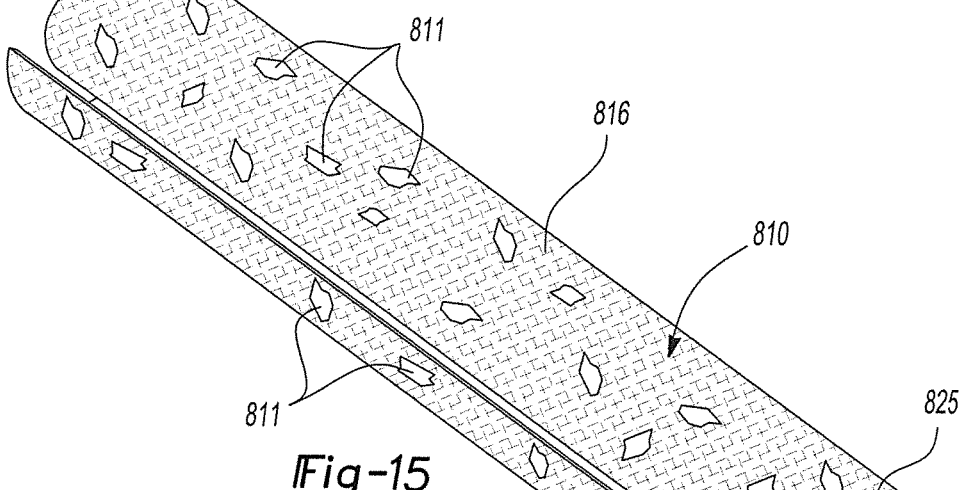
FIG. 15 is a perspective view of an embodiment of the edible pet chew using the single sheet shown in FIG. 14.
Figure 16:
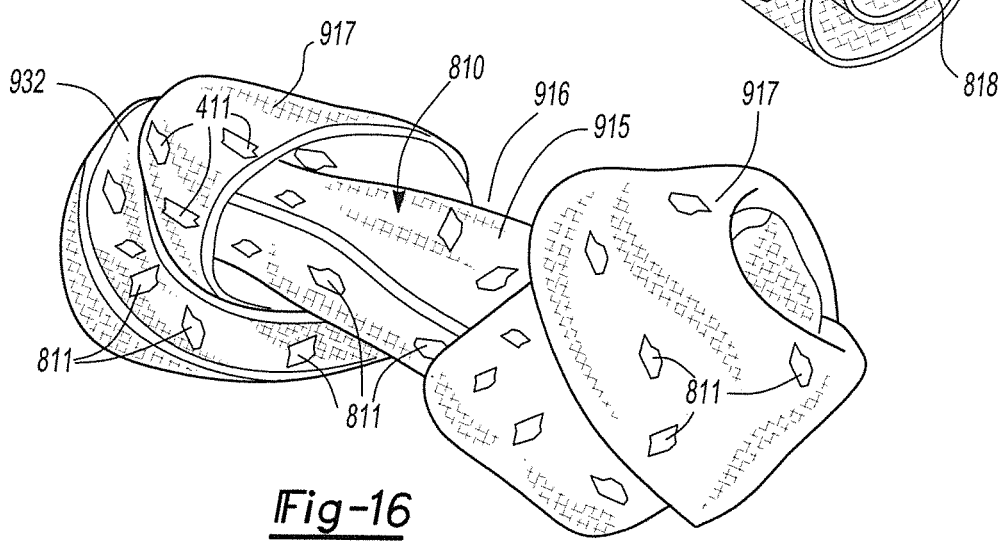
FIG. 16 is another embodiment having two knotted ends to simulate the epiphyses of a bone with a diaphysis in the middle using the single sheet shown in FIG. 14.

Another alternate embodiment of a single sheet 810 for making a pet chew is shown in FIGS. 14-16 which shows a single extruded sheet 810 with flavor chunks 811 of dried meat or other flavored food stuff embedded therein. The chunks 811 are preferably visible from either side of the single sheet 810. The single sheet 810 as shown in FIG. 14 is then rolled up as shown in FIG. 15 to form a cylinder shaped edible pet chew 816. The pet chew 816 has rolled end sections 825 that appear from an end view to have a spiral shape 818. The cylinder shaped pet chew 816 is then allowed to dry to harden the composition forming the single sheet 810.

As shown in FIG. 16, an alternate shaped pet chew 916 can be formed to more closely simulate an elongated bone with an elongated middle section 915 also referred to as a diaphysis and opposite simulated epiphyses 917 formed by knots 932 tied at each end 825 of the cylinder shaped assembly 816 as shown in FIG. 15 before it's hardened. The alternately shaped edible pet chew 916 has the chunks 811 embedded in the sheet 810 and visible at an outer portion of the epiphyses 917 as well as therebetween at the exterior side of the elongated middle section 915. Depending on the desired size of the chunks 811, the chunks 811 may either be extruded with the remaining animal flesh/plant composition or rolled into the composition after it is extruded.

It should be understood that the above described co-extruded sheet 410, multi-layer sheet 610 and embedded sheet 810 can also be substituted for the sheet 10 as shown in FIGS. 1-7.

Reference now is made to FIG. 17 which discloses another embodiment of a pet chew 960 according to the invention. Pet chew 960 has an outer chew layer 965 folded over an edible meat layer 975. Two diagonal opposite corners 977 are then lifted to roll the pet chew into its final shape with an apex 980. Two opposite corners 970 form tapered ends of the pet chew 960. The pet chew is then hardened in this shape.

In this fashion, by providing an edible pet chew with a hardened and chewable or casing made from edible material instead of rawhide or animal hides, one avoids all the concerns, whether real or perceived, or whether nutritional or economical regarding the use of rawhide or animal hides. Secondly, the composite material has inherent nutrition and may be easily provided with added nutritional ingredients such as vitamins and minerals if desired. The use of animal flesh and/or animal innards in the treats caters to the natural carnivorous nature of dogs and provides for a desirable pet chew and provides a chew that a dog will not lose interest in after only a short period of time.

Other variations and modifications are possible without departing from the scope and spirit of the present invention as defined by the appended claims.

The embodiments in which an exclusive property or privilege is claimed are defined as follows:

1. A method of forming an edible pet chew, said method comprising:
   providing a plant based mixture that is substantially rawhide free, extrudable, and initially malleable;
   forming said initially malleable plant based mixture into a first sheet that is dimensioned large enough and thin enough to be initially malleable for use as a wrap by flexing, folding or rolling into a shape;
   providing a second sheet made from flavor material that is substantially rawhide free;
   placing said first and second sheets in superimposed relation and rolling said first and second sheets to form layers with no intervening rawhide layers resulting in the edible pet chew; and
   tying the edible pet chew into knots.

2. The method of claim 1 further including a step of:
   after tying, hardening said first sheet.

3. The method of claim 1 wherein the step of tying includes tying opposite ends of said edible pet chew.

4. The method of claim 1 wherein: said first sheet comprises a plant protein composition; and said second sheet comprises a meat based material.

5. The method of claim 1 wherein: said first sheet comprises a plant protein and gelatin composition; and said second sheet comprises a meat jerky.

6. The method of claim 1 further including:
wrapping said first sheet about said second sheet to form an outer layer of said edible pet chew.

7. The method of claim 6 wherein the step of wrapping is before the step of tying.

8. The method of claim 7 wherein the step of placing said first and second sheets in superimposed relation includes and rolling said first and second sheets to form alternating layers of the first and second sheets.

9. A method of forming an edible pet chew, said method comprising:
providing a plant based mixture that is substantially rawhide free, extrudable, and initially malleable;
forming said initially malleable plant based mixture into a single sheet that is dimensioned large enough and thin enough to be initially malleable for flexing, folding or rolling into a shape;
forming the single sheet to have co-extruded first and second areas with a different appearance or flavor from each other; and
rolling the single sheet into a cylindrical roll, wherein the single sheet has a first edge section with said different appearance or flavor from a mid-section of said single sheet; and said first edge section is positioned at an outer edge of said cylindrical roll.

10. The method of claim 9 further including knotting opposite ends of the cylindrical roll.

11. The method of claim 9 wherein the single sheet has a second edge section having
a different appearance or flavor from the mid-section of said single sheet; and
said second edge section is positioned at an interior portion of said cylindrical roll.

12. A method of forming an edible pet chew; the method comprising:
providing a co-extruded sheet of hardened edible chewable material dimensioned large enough and thin enough to be initially malleable for flexing, folding or rolling into a final shape;
wherein a first section of said co-extruded sheet has a first appearance or first flavor;
wherein a second section of said co-extruded sheet has a second appearance or second flavor; and
shaping said co-extruded sheet by flexing, folding or rolling before hardening into said final shape.

13. The method of claim 12 wherein the said co-extruded sheet is rawhide free and animal hide free.

14. The method of claim 12 further including:
rolling the co-extruded sheet about a jerky member to form the pet chew.

15. The method of claim 14 further including:
after the step of rolling, knotting opposite ends of the pet chew.

16. The method of claim 15 wherein said first and second sections being respective first and second layers of said coextruded sheet.

* * * * *